(12) United States Patent
Khot et al.

(10) Patent No.: US 8,456,509 B2
(45) Date of Patent: Jun. 4, 2013

(54) PROVIDING PRESENTATIONS IN A VIDEOCONFERENCE

(75) Inventors: Gautam Khot, Bangalore (IN); Prithvi Ranganath, Bangalore (IN); Raghuram Belur, Bangalore (IN); Sandeep Lakshmipathy, Bangalore (IN)

(73) Assignee: LifeSize Communications, Inc., Austin, TX (US)

( * ) Notice: Subject to any disclaimer, the term of this patent is extended or adjusted under 35 U.S.C. 154(b) by 756 days.

(21) Appl. No.: 12/684,582

(22) Filed: Jan. 8, 2010

(65) Prior Publication Data
US 2011/0169910 A1 Jul. 14, 2011

(51) Int. Cl.
*H04N 7/15* (2006.01)
*H04M 3/56* (2006.01)
*G09B 5/00* (2006.01)

(52) U.S. Cl.
USPC ............ 348/14.09; 345/473; 348/14.08; 370/260; 382/118; 434/350; 704/260; 709/203; 709/204; 709/205; 709/227; 715/730; 715/753

(58) Field of Classification Search
USPC ............ 345/473; 348/14.08, 14.09; 370/260; 382/118; 434/350; 704/260; 709/203, 204, 709/205, 227; 715/730, 753
See application file for complete search history.

(56) References Cited

U.S. PATENT DOCUMENTS

| | | | | |
|---|---|---|---|---|
| 5,491,797 A | * | 2/1996 | Thompson et al. | 709/204 |
| 5,784,561 A | * | 7/1998 | Bruno et al. | 709/204 |
| 5,841,763 A | * | 11/1998 | Leondires et al. | 370/260 |
| 5,991,276 A | * | 11/1999 | Yamamoto | 370/260 |
| 5,999,966 A | * | 12/1999 | McDougall et al. | 709/204 |
| 6,011,782 A | * | 1/2000 | DeSimone et al. | 370/260 |
| 6,157,401 A | * | 12/2000 | Wiryaman | 348/14.09 |
| 6,532,218 B1 | * | 3/2003 | Shaffer et al. | 370/260 |
| 6,560,637 B1 | | 5/2003 | Dunlap et al. | |
| 6,633,324 B2 | * | 10/2003 | Stephens, Jr. | 348/14.09 |
| 6,693,661 B1 | | 2/2004 | Vanderwilt et al. | |
| 6,760,749 B1 | * | 7/2004 | Dunlap et al. | 709/204 |
| 6,941,343 B2 | | 9/2005 | Kenoyer et al. | |
| 7,023,465 B2 | * | 4/2006 | Stephens, Jr. | 348/14.09 |

(Continued)

OTHER PUBLICATIONS

"WebEx: Web Conferencing & Meetings, Video Conference, Net Meeting, Webinar Solutions"; Dec. 22, 2007; <http://web.archive.org/web/20071222080539/http://www.webex.com/>.

(Continued)

*Primary Examiner* — Gerald Gauthier
(74) *Attorney, Agent, or Firm* — Meyertons Hood Kivlin Kowert & Goetzel, P.C.; Jeffrey C. Hood; Mark S. Williams

(57) ABSTRACT

System and method for performing a videoconference. One or more computers are utilized to schedule a videoconference call in response to user input requesting the videoconference call, where the user input further specifies presentation materials for presentation during the videoconference call. The presentation materials are uploaded to a content server computer, and the videoconference call is conducted between a plurality of participants at respective participant locations, where the videoconference call is performed using a plurality of videoconferencing endpoints at respective ones of the participant locations, and where the plurality of videoconferencing endpoints are coupled to the content server computer over a network. During the videoconference call, the presentation materials are provided to each of the plurality of videoconferencing endpoints from the content server computer over the network, where the provided presentation materials are presented by each videoconferencing endpoint.

25 Claims, 8 Drawing Sheets

U.S. PATENT DOCUMENTS

| | | | | |
|---|---|---|---|---|
| 7,102,643 | B2 * | 9/2006 | Moore et al. | 345/473 |
| 7,176,957 | B2 * | 2/2007 | Ivashin et al. | 348/14.09 |
| 7,283,154 | B2 | 10/2007 | Shachar et al. | |
| 7,437,463 | B1 * | 10/2008 | Valletutti et al. | 709/227 |
| 7,454,460 | B2 * | 11/2008 | Ivashin | 709/203 |
| 7,477,281 | B2 * | 1/2009 | Chandra et al. | 348/14.09 |
| 7,499,075 | B2 * | 3/2009 | Miceli | 348/14.09 |
| 7,558,221 | B2 | 7/2009 | Nelson et al. | |
| 8,060,004 | B2 * | 11/2011 | Kalisiak | 434/350 |
| 8,189,030 | B2 * | 5/2012 | Ivashin et al. | 348/14.08 |
| 8,212,855 | B2 * | 7/2012 | Gupta et al. | 348/14.08 |
| 8,218,829 | B2 * | 7/2012 | Kenoyer | 382/118 |
| 2001/0043571 | A1 * | 11/2001 | Jang et al. | 370/260 |
| 2004/0230655 | A1 * | 11/2004 | Li et al. | 709/205 |
| 2004/0236830 | A1 * | 11/2004 | Nelson et al. | 709/204 |
| 2006/0087553 | A1 | 4/2006 | Kenoyer et al. | |
| 2006/0259552 | A1 | 11/2006 | Mock et al. | |
| 2007/0171274 | A1 * | 7/2007 | Yim | 348/14.08 |
| 2008/0307324 | A1 * | 12/2008 | Westen et al. | 715/753 |
| 2010/0225736 | A1 * | 9/2010 | King et al. | 348/14.09 |
| 2010/0225737 | A1 * | 9/2010 | King et al. | 348/14.09 |
| 2010/0241432 | A1 * | 9/2010 | Michaelis | 704/260 |
| 2010/0293469 | A1 * | 11/2010 | Khot et al. | 715/730 |
| 2011/0058013 | A1 * | 3/2011 | Khot et al. | 348/14.09 |
| 2011/0169910 | A1 * | 7/2011 | Khot et al. | 348/14.09 |

OTHER PUBLICATIONS

"Polycom People + Content IP"; Polycom, Inc.; Feb. 2010; 3 pages. <http://www.polycom.com/products/telepresence_video/accessories/hdx_accessories/people_content_ip.html>.

* cited by examiner

PROVIDING PRESENTATIONS IN A VIDEOCONFERENCE

FIELD OF THE INVENTION

The present invention relates generally to videoconferencing, and more specifically, to a method for providing presentations in a videoconference call.

DESCRIPTION OF THE RELATED ART

Videoconferencing may be used to allow two or more participants at remote locations to communicate using both video and audio. Each participant location may include a videoconferencing system for video/audio communication with other participants, which may be referred to as an endpoint. For example, each videoconferencing system may include a camera and microphone to collect video and audio from a first or local participant to send to other (remote) participant(s), as well as a display and speaker(s) to reproduce video and audio received from one or more remote participants. In any videoconference there can be endpoints in any of various parts of the world, and via different networks.

In many videoconferences, a user may wish to show a presentation to the videoconference participants. Presently, any individual can share presentations on videoconferencing systems that are H.239 compliant. H.239 refers to a multimedia communications protocol that facilitates use of multiple video channels (and which covers both H.323 and BFCP (Binary Flow Control Protocol)) so that in addition to conference video, presentation materials may also be displayed to participants. Typically, the presentation feed is available on a separate channel and can be viewed by all the participants of the conference. The presentation materials generally reside on the computer (e.g., laptop computer) of the individual presenter (participant), and the screen output of the computer is fed into the videoconferencing system for all participants of the conference to view the material.

However, the requirement that a computer, e.g., a laptop, be provided, e.g., at the presenter's endpoint location, to facilitate presentation of the presentation materials is onerous and expensive, and may limit the functionality of the videoconferencing system with respect to other participants of the videoconference call.

Accordingly, improved systems and method for videoconferencing are desired.

SUMMARY OF THE INVENTION

Various embodiments are presented of a system and method for providing a presentation in a videoconference call.

A videoconference call may be scheduled in response to user input requesting the videoconference call, e.g., from a "host participant" or meeting organizer The user input may further specify presentation materials for presentation during the videoconference call. Thus, in one embodiment, as part of the request, the user input (of the host participant) may specify the presentation materials, e.g., as an attachment, where the presentation materials are to be presented during the requested videoconference call. For example, as part of creating the meeting request, e.g., using videoconference management software, such as a videoconference management suite or within scheduling software integrated with the management suite, all of which may be referred to generally as a management server or program, the host participant may attach (or otherwise specify) one or more documents that she wishes to present during the meeting to the request. The request may be transmitted over a network to a server computer, e.g., to the management server or program, e.g., scheduling software in a control management suite, executing on the server computer, which in one embodiment may include or be coupled to a content server, e.g., a computer or mass storage device. The meeting request may then be processed by the management server.

The presentation materials may be uploaded to a content server computer. For example, in one embodiment, the management server or program may receive the presentation materials via the host participant's request, and store the presentation materials on the content server computer, or, as noted above, may receive information from the host indicating where the materials may be found, and may retrieve them accordingly. Thus, the first videoconferencing endpoint may be configured to schedule a videoconference call with the management server in response to user input requesting the videoconference call, where the user input further specifies presentation materials for presentation during the videoconference call, and the presentation materials may be uploaded to the content server computer by the management server in response to the scheduling. Alternatively, the management server may act as the content server.

The videoconference call may then be conducted between a plurality of participants at respective participant locations, per the above scheduling. The videoconference call may be performed using a plurality of videoconferencing endpoints at respective ones of the plurality of participant locations. Thus, each participant location may include a respective endpoint or conferencing unit, as described below in more detail. Each endpoint may be used by a respective participant to perform or implement the conference call, e.g., by providing and receiving conference communication for each participant. Thus, the plurality of endpoints may be comprised in a videoconferencing system that may facilitate or implement videoconferencing calls among respective participants at respective participant locations.

During the videoconference call, the presentation materials may be provided or transmitted (e.g., streamed) to each of the plurality of videoconferencing endpoints from the content server computer over the network, possibly under control of the management server or program, and may be presented by each videoconferencing endpoint, e.g., to their respective participants. In other words, each videoconferencing endpoint may be configured to receive the presentation materials provided (e.g., streamed) from the content server computer (directly or indirectly) during the videoconference call, and present the provided, e.g., streamed, presentation materials (also during the call).

BRIEF DESCRIPTION OF THE DRAWINGS

A better understanding of the present invention may be obtained when the following detailed description is considered in conjunction with the following drawings, in which.

Figure 1:
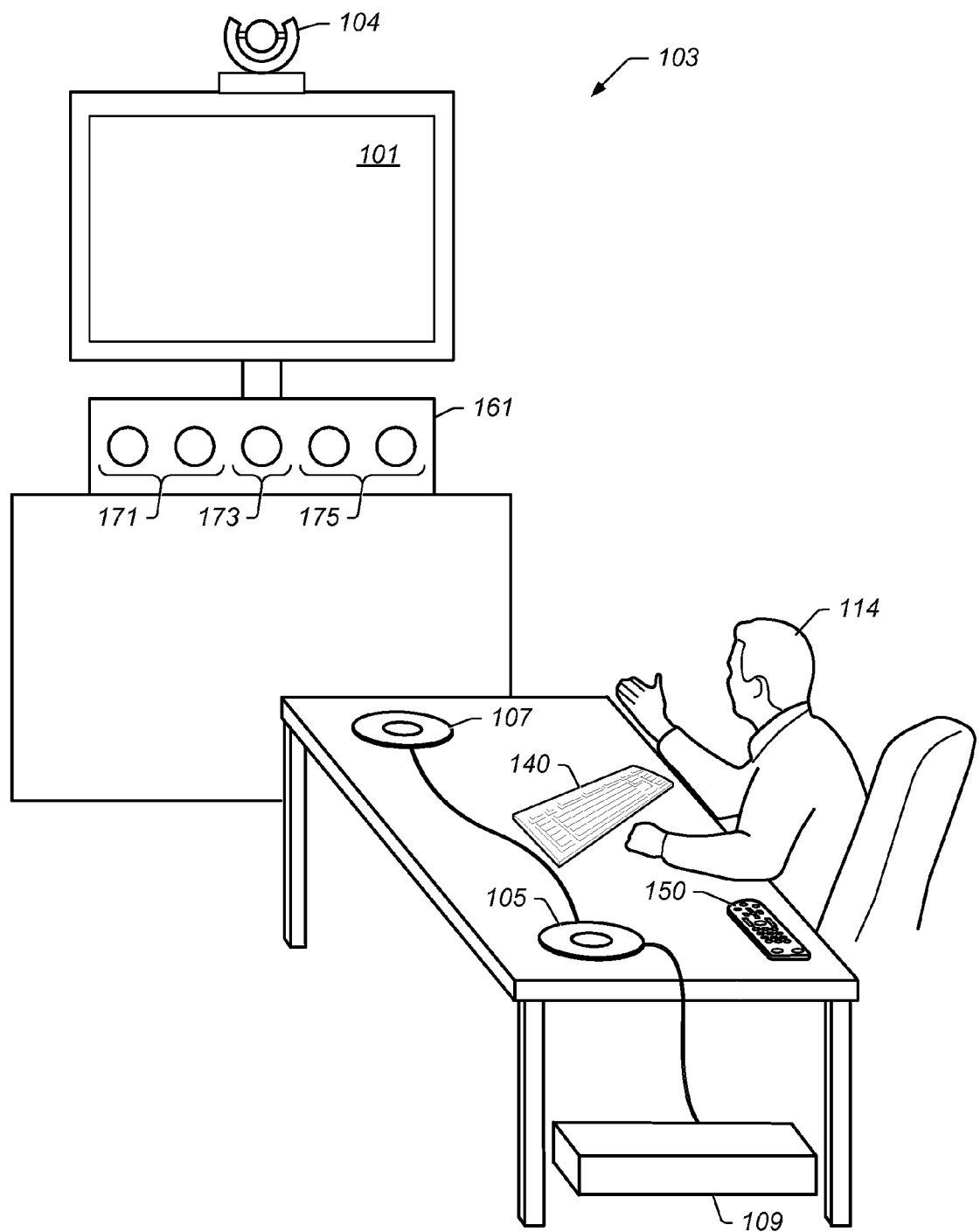
FIGS. 1 and 2 illustrate exemplary videoconferencing endpoints, according to respective embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note that the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Email Based Remote Management of Network Connected Entities", Ser. No. 12/389, 902 which was filed Feb. 20, 2009, whose inventors are Gautam Khot, Prithvi Ranganath, Raghuram Belur, and Sandeep Lakshmipathy.

Figure 2:

FIGS. 1 and 2—Exemplary Videoconferencing Endpoints

FIG. 1 illustrates an exemplary embodiment of a videoconferencing endpoint 103 at a videoconferencing participant location. Note that, as used herein, the term videoconferencing endpoint, or simply "endpoint", may also be referred to as a videoconferencing system (VS), videoconferencing unit (VU), or conferencing unit (CU). The videoconferencing endpoint 103 may have a system codec 109 to manage both a speakerphone 105/107 and videoconferencing hardware, e.g., camera 104, display 101, speakers 171, 173, 175, etc. The speakerphones 105/107 and other videoconferencing endpoint components may be coupled to the codec 109 and may receive audio and/or video signals from the system codec 109. Note that the term "codec", is short for a compressor/decompressor device or functionality for encoding and/or decoding (e.g., compressing and decompressing) data (e.g., audio and/or video data), and may refer to any system and/or method for encoding and/or decoding such data. Thus, an endpoint may be or include a codec.

In some embodiments, the videoconferencing endpoint may include a camera 104 (e.g., an HD camera) for acquiring images of the participant (e.g., of participant 114). Other cameras are also contemplated. The endpoint may also include display 101 (e.g., an HDTV display). Images acquired by the camera 104 may be displayed locally on the display 101 and/or may be encoded and transmitted to other endpoints at other participant locations in the videoconference.

The endpoint may further include one or more input devices, such as the computer keyboard 140 or a mouse (not shown), and in some embodiments, a remote control 150. In some embodiments, the one or more input devices may be used for the videoconferencing system 103 and/or may be used for one or more other computer systems at the participant location, as desired.

The endpoint may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to a system codec 109. The system codec 109 may be placed on a desk or on a floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system. The conferencing system may be controlled by a participant or user through the user input components (e.g., buttons) on the speakerphones 105/107 and/or input devices such as the keyboard 140 and/or the remote control 150. Other system interfaces may also be used.

In various embodiments, a codec may implement a real time transmission protocol. In some embodiments, a codec (short for "compressor/decompressor") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may include MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) or endpoints described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and may not be used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system 200 with a video camera, input devices, microphone and/or speakers such as the videoconferencing system of FIG. 2). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

The videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference.

Note that the videoconferencing system shown in FIGS. 1 and 2 may be configured or modified to be an audioconferencing system. The audioconferencing system, for example, may simply include speakerphones 105/107, although additional components may also be present. Additionally, note that any reference to a "conferencing system" or "conferencing systems" may refer to videoconferencing systems, audioconferencing systems (e.g., teleconferencing systems), or web conferencing systems. For simplicity and clarity, the techniques disclosed herein are primarily described in terms of videoconferencing, although it should be noted that the techniques may be equally applicable to teleconferencing and/or web conferencing. Moreover, the term "videoconferencing" is considered to be a superset of teleconferencing and web conferencing, and so the below descriptions directed to videoconferencing inherently include teleconferencing and web conferencing, as well. Thus, for example, in embodiments, one or more participants may join the videoconference over the web by communicatively coupling to the host codec/endpoint of the videoconference. Similarly, audio (only) participants may join in via dialing a PSTN (public switched telephone network) call into the ongoing videoconference call, where they may only hear the audio of the ongoing videoconference call.

Thus, in some embodiments, the videoconferencing endpoint or CU (e.g., of FIG. 1 or 2) may be configured with program instructions (i.e., stored in a memory of the endpoint) that may be executable by a processor of the endpoint to perform or implement at least a portion of the functionality and techniques disclosed herein, as will be described in detail below.

Figure 3A:
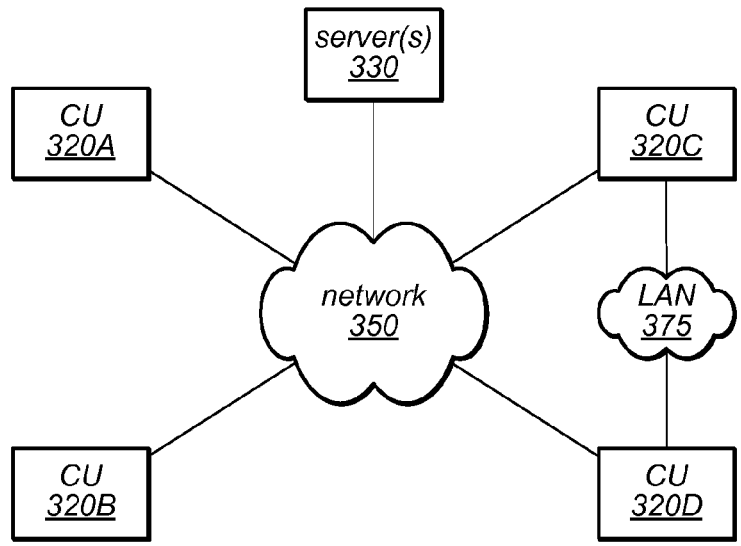
FIGS. 3A and 3B illustrate exemplary conferencing systems coupled in different configurations, according to some embodiments.
Figure 3B:
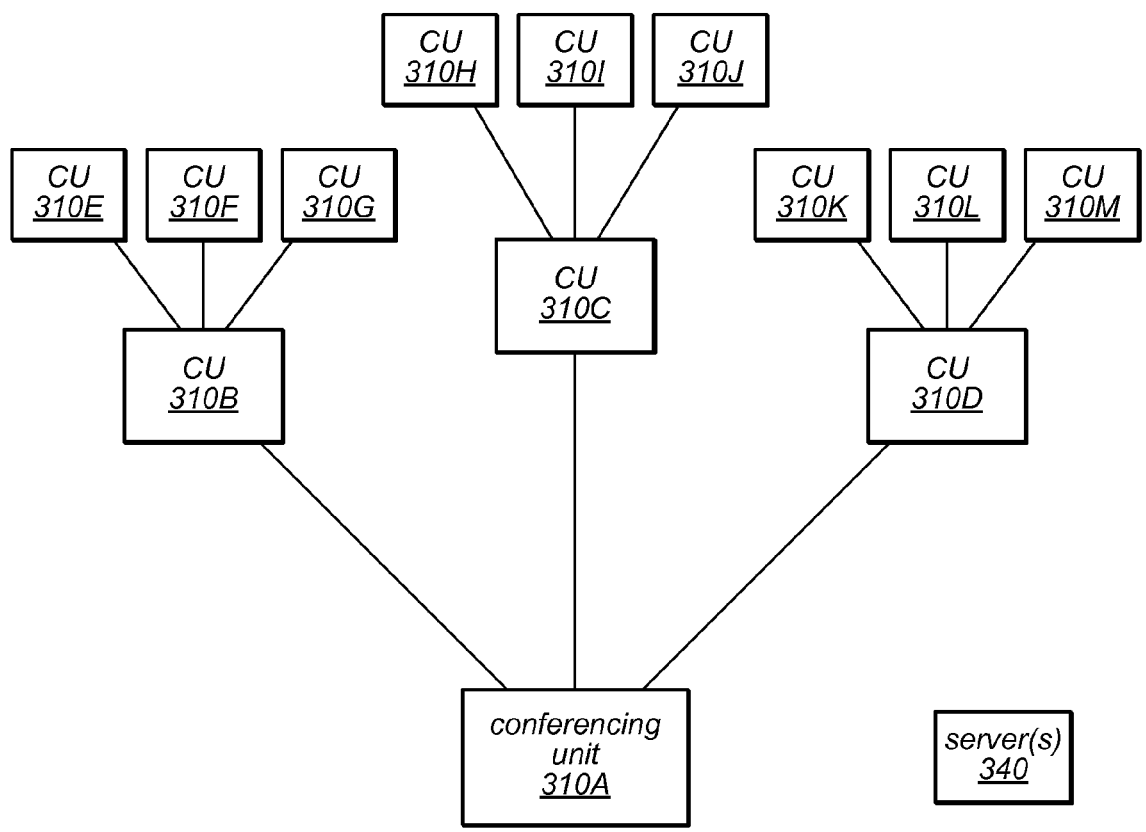

FIGS. 3A and 3B—Exemplary Conferencing Systems

FIGS. 3A and 3B illustrate different configurations of conferencing systems. The conferencing systems may be configured to perform the methods described herein. As shown in FIG. 3A, endpoints or conferencing units (CUs) 320A-D (e.g., videoconferencing endpoints described above) may be connected via network 350 (e.g., a wide area network such as the Internet) and CU 320C and 320D may be coupled over a local area network (LAN) 375. The networks may be any type of network (e.g., wired or wireless) as desired. As FIG. 3A shows, in one embodiment, the conferencing system may further include at least one server computer 330 (i.e., one or more server computers), coupled to the endpoints (or CUs) via the network 350. The at least one server computer 330 may include a processor and memory, and, possibly in conjunction with one or more of the endpoints, may be configured to implement or perform at least a portion of the functionality and techniques disclosed herein. In some embodiments, the server(s) 330 may be or include or be included in an endpoint or CU, as desired, or may be distributed across multiple endpoints.

FIG. 3B illustrates a relationship view of endpoints or conferencing units 310A-310M, according to one embodiment. As shown, endpoint or CU 310A may be aware of CU 310B-310D, each of which may be aware of further CU's (310E-310G, 310H-310J, and 310K-310M respectively). CU 310A may be operable to perform the methods described herein. In a similar manner, each of the other CUs shown in FIG. 3B, such as CU 310H, may be able to perform the methods described herein, as described in more detail below. Similar remarks apply to CUs 320A-D in FIG. 3A.

As also shown, in this embodiment, at least one server computer 340 may be communicatively connected to CU 310A, and thereby coupled to all of the CUs, although in various other embodiments, the at least one server computer 340 may be coupled to the CUs via other means, e.g., via a network, such as a LAN or the Internet, to which the CUs are themselves coupled, or via any of the CUs in the system. The server(s), possibly in conjunction with one or more of the endpoints, may be configured to perform or implement at least a portion of the techniques disclosed herein, as will be described in more detail below. In some embodiments, the at least one server computer 340 may be or include multiple server computers, e.g., a content server computer coupled to a management server computer, e.g., that executes a management program or programs. In other embodiments, the at least one server computer may be a single computer, e.g., that includes or operates as both a content server and a management server.

As with the system of FIG. 3A, in some embodiments, the server(s) 340 may be or include or be included in an endpoint or CU, as desired, or may be distributed across multiple endpoints (CUs).

Overview

Below are described various techniques for conducting a videoconference call. In some embodiments, the techniques disclosed herein may facilitate presenters of an audio/video feed, e.g., an H239 feed, to initiate and conduct a videoconference call, i.e., meeting, without having to provide an additional computer, such as a laptop computer, and yet be able to present the desired presentation materials, e.g., slides, documents, video, audio, spreadsheets, etc., among others, to the rest of the participants. At the time of scheduling, the meeting host (e.g., organizer) may attach (or otherwise specify) the presentation materials, e.g., documents or any other type of files comprising the materials she wishes to present during the meeting, as part of creating a videoconference meeting request via management (e.g., scheduling) software. The management software may upload the presentation materials to a secure content server for access during the meeting. At the start of the meeting, a connection may be established by the management software to the content server to provide, e.g., stream, the presentation materials to the meeting host endpoint so that the host (or other participant) can access/browse and present the presentation materials to rest of the participants, and/or to each of the participants directly.

Note that the term "streaming" generally refers to a method for multi-media data delivery where the data are (substantially) constantly received by and presented to a user, e.g., where the data are provided or delivered by a streaming provider over a network. While in some embodiments of the techniques disclosed herein, the presentation materials may be streamed to the participants, more generally, the presentation materials may be provided for presentation in any manner desired. Thus, the term "providing" is intended to include, but not be limited to, streaming.

Figure 4:
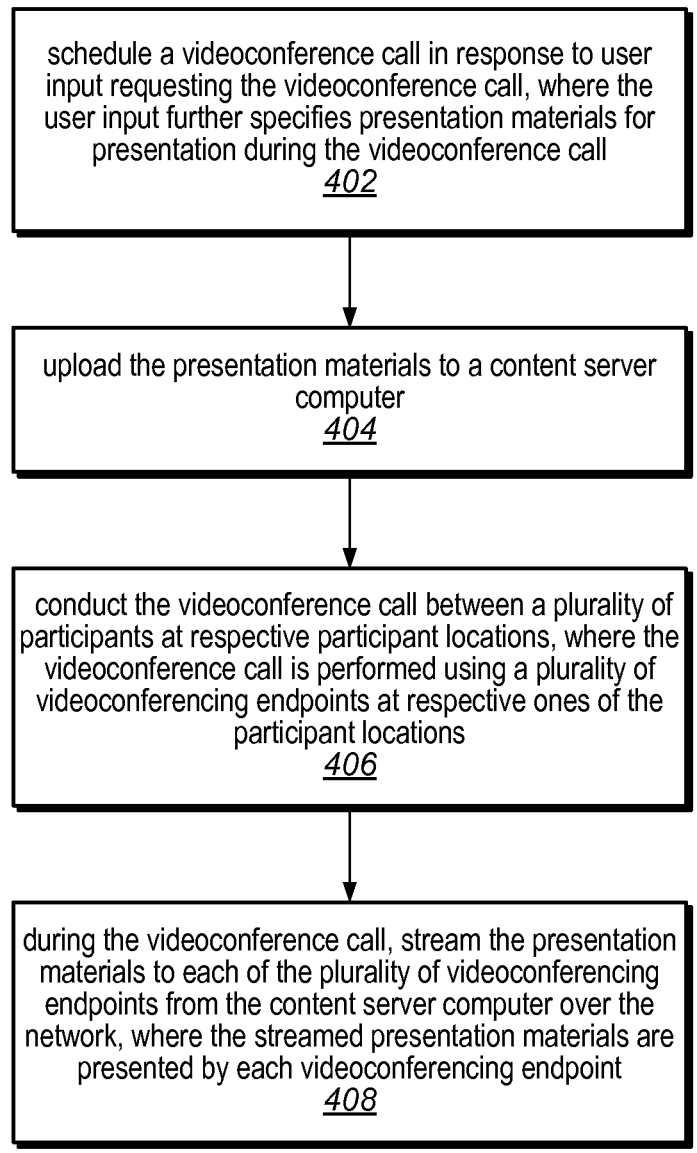
FIG. 4 is a flowchart diagram illustrating an exemplary method for performing a videoconference call, according to an embodiment.

FIG. 4—Method for Performing a Videoconference

FIG. 4 illustrates a method for performing a video conference, according to one embodiment. The method shown in FIG. 4 may be used in conjunction with or via any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, a videoconference call may be scheduled in response to user input requesting the videoconference call. The user input may further specify presentation materials for presentation during the videoconference call.

Figure 5:
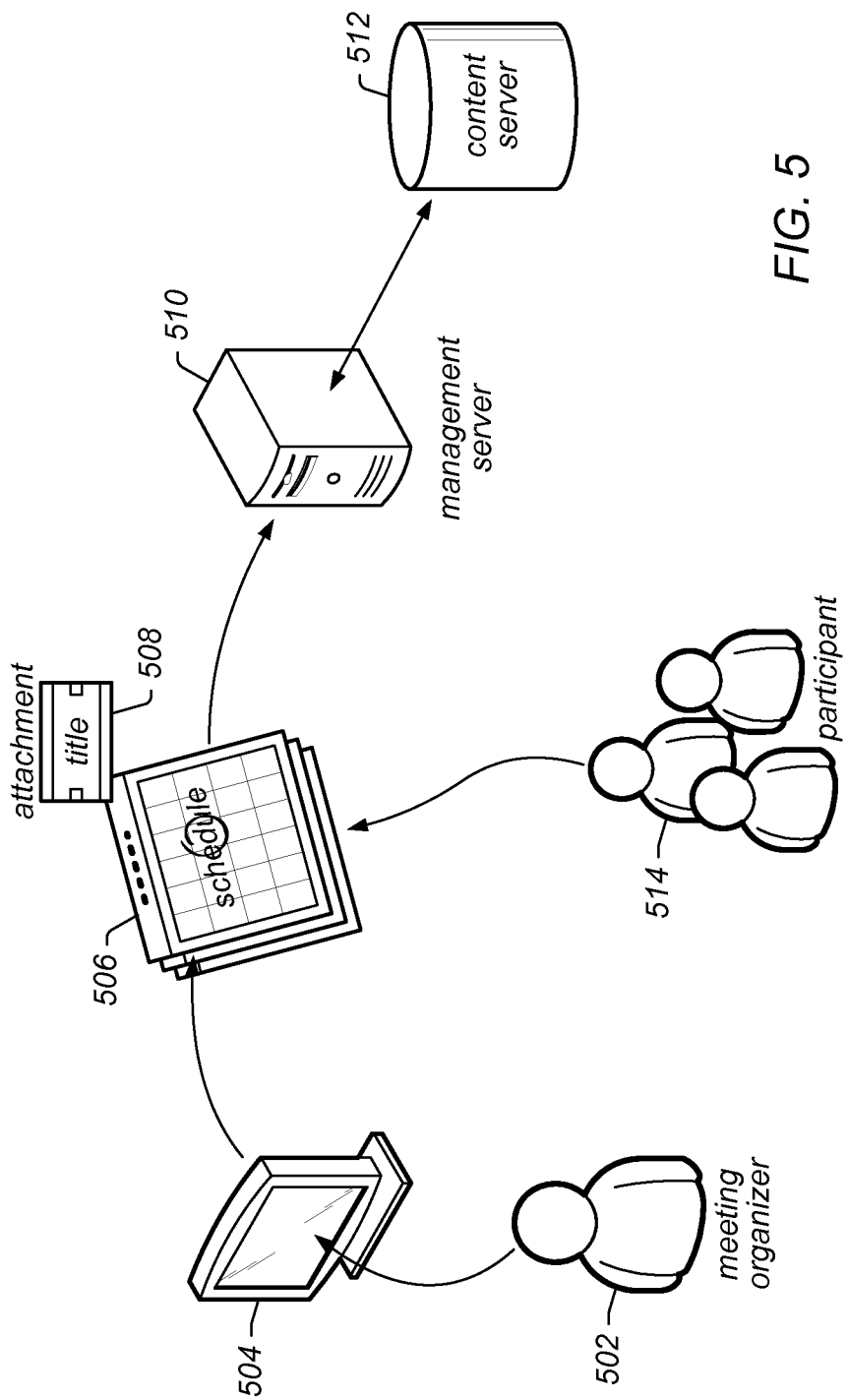
FIG. 5 illustrates scheduling a videoconference call in an exemplary videoconferencing system, according to one embodiment.

FIG. 5 illustrates scheduling of a videoconferencing meeting, according to one exemplary embodiment. As shown, a meeting organizer 502, e.g., host participant, may provide user input to a computer system (possibly an endpoint) 504 requesting a videoconference call, e.g., a meeting organizer may schedule a video meeting between 3 parties: herself (video room 1), video room 2 and video room 3. Other people may be invited to join the meeting at the rooms of their choice.

Thus, in one embodiment, as part of the request, the user input (of the host participant) may further specify the presentation materials 508, e.g., as an attachment, where the presentation materials are to be presented during the requested videoconference call. For example, as part of creating the meeting request, e.g., using videoconference management software, such as a videoconference management suite or within scheduling software integrated with the management suite, all of which may be referred to generally as the management server, the host participant may attach (or otherwise specify) one or more documents that she wishes to present during the meeting to the request. The request may be transmitted over a network to a server computer, e.g., to the management server or program 510, e.g., scheduling software in a control management suite, executing on the server computer, which in one embodiment may include or be coupled to a content server 512, e.g., a computer or mass storage device. The meeting request may then be processed by the management server.

As indicated in FIG. 5, other (e.g., invited) participants 514 may also provide user input, e.g., via respective computer systems (also possibly endpoints), indicating participation in the videoconference call. For example, the videoconference request by the host participant may include invitations to the other participants, or may invoke such invitations by the management server 510, to which the participants may respond, e.g., by accepting (or declining) the invitation. The management server may interpret the request from the meeting organizer (i.e., host participant) and may schedule a videoconference to start at the desired time among the desired participants. In one embodiment, the management server may detect or observe the attachment that has been sent as part of the meeting schedule request and may understand it to be the presentation materials that the host wishes to present during the meeting duration. Note that in other embodiments, the host may not actually attach the presentation materials, but may instead specify where the materials may be found, e.g., via a URI (universal resource identifier, file path, etc.), and the management server may retrieve the presentation materials from the specified location.

In 404, the presentation materials may be uploaded to a content server computer. For example, in one embodiment, the management server or program may receive the presentation materials via the host participant's request, and store the presentation materials on the content server computer, or, as noted above, may receive information from the host indicating where the materials may be found, and may retrieve them accordingly. Thus, the first videoconferencing endpoint may be configured to schedule a videoconference call with the management server in response to user input requesting the videoconference call, where the user input further specifies presentation materials for presentation during the videoconference call, and the presentation materials may be uploaded to the content server computer by the management server in response to the scheduling.

Figure 6:
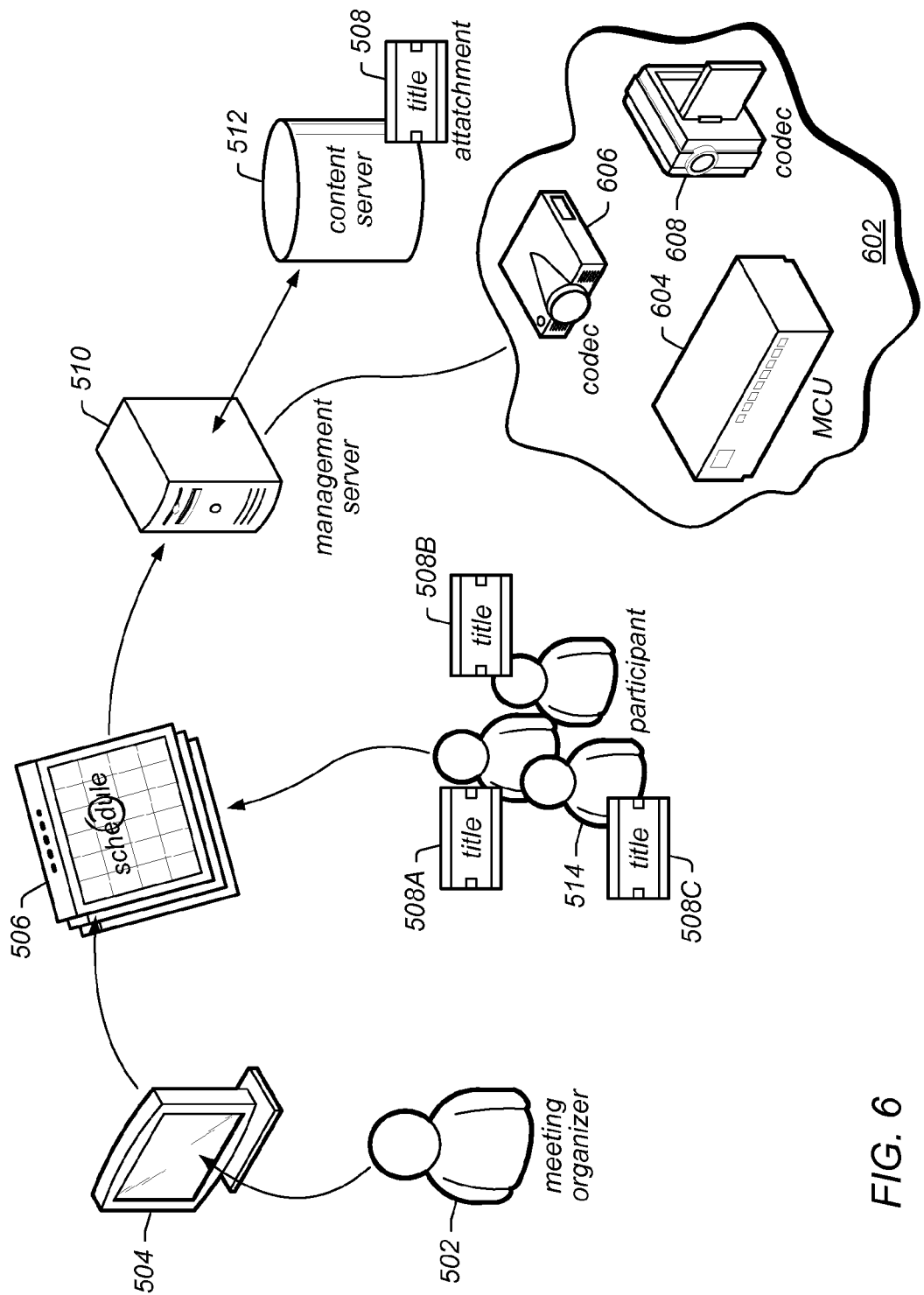
FIG. 6 illustrates processing of a videoconference call request in the exemplary videoconferencing system of FIG. 5, according to one embodiment.

FIG. 6 illustrates one embodiment of such uploading of the presentation materials as part of or in response to the scheduling of the videoconference call by the management server or program (e.g., by the control management suite). In the embodiment shown, as part of the scheduling process, each of the invited participants 514 may be provided a copy of the presentation materials 508, where the respective copies are labeled 508A, 508B, and 508C. It should be noted that the number of participants (and respective copies of the presentation materials) shown in FIGS. 5 and 6 are meant to be exemplary only, and are not intended to limit the number of participants to any particular value, e.g., the number of participants may range from two to any number desired.

As FIG. 6 also indicates, in some embodiments, in addition to scheduling the videoconference call in response to the request, the management server 510 may be further configured to reserve resources 602 for conducting the videoconference call, e.g., endpoints or codecs 606 and 608, a multipoint control unit (MCU) 604, and so forth. In one embodiment, the management server 510 may also reserve meeting or (video)conference rooms, as desired, e.g., as part of reserving the endpoints.

Note that the communication of scheduling information may be performed in any of various ways. For example, in one embodiment, every endpoint or codec may be assigned a mailbox. The host participant may send invitation emails or proposed videoconference schedules to proposed participants via these respective mailboxes. Emails/schedules sent to this mailbox may be forwarded to a mailbox of the management server 510, which may process the schedules and determine which endpoints are to participate in the videoconference call. Thus, for example, in some embodiments, each proposed participant, e.g., each person that has been invited to participate in the videoconference call, or that has scheduled their participation, may be provided with respective copies of the presentation materials as attachments to these emails. For more details regarding use of endpoint mailboxes, please see U.S. patent application Ser. No. U.S. patent application Ser. No. 12/389,902, titled "Email Based Remote Management of Network Connected Entities", which was incorporated by reference above. However, it should be noted that any other means for communicating and processing the schedule information may be used as desired.

In 406, the videoconference call may be conducted between a plurality of participants at respective participant locations, per the scheduling of 402. The videoconference call may be performed using a plurality of videoconferencing endpoints at respective ones of the plurality of participant locations. Thus, each participant location may include a respective endpoint or conferencing unit, such as those described above with reference to FIGS. 1 and 2. Each endpoint may be used by a respective participant to perform or implement the conference call, e.g., by providing and receiving conference communication for each participant. Thus, the plurality of endpoints may be comprised in a videoconferencing system that may facilitate or implement videoconferencing calls among respective participants at respective participant locations.

Note further that in some embodiments, the plurality of endpoints (or CUs) may itself be a subset of a larger plurality of endpoints. For example, in addition to the plurality of endpoints, the videoconferencing system may include or be coupled to additional endpoints that may be operable to participate in the videoconference call, but which may not be configured to perform some of the functionality or techniques disclosed herein.

Moreover, in some embodiments, one or more participants (and corresponding endpoints) in the videoconferencing call may operate as web conferencing participants/endpoints, or as teleconferencing participants/endpoints, as indicated above. For example, in a teleconference embodiment, a participant/endpoint may participate in the videoconference call via audio, and may not include video information. Likewise regarding web conferencing participants/endpoints. In other words, some of the participants/endpoints may utilize only a subset of the videoconferencing data provided, e.g., streamed.

As indicated in 408, during the videoconference call, the presentation materials may be provided, e.g., streamed, to each of the plurality of videoconferencing endpoints from the content server computer over the network, possibly under control of the management server or program, and may be presented by each videoconferencing endpoint, e.g., to their respective participants. In other words, each videoconferencing endpoint may be configured to receive the presentation materials provided by, e.g., streamed from, the content server computer during the videoconference call, and present the presentation materials (also during the call).

Note that in various embodiments, the management and content server functionality may be implemented in any of various ways. For example, as described above, in one embodiment, the scheduling, uploading, and conducting may be performed by a management server, e.g., the management server of FIGS. 5 and 6. The management server 510 may be implemented on or included in the content server computer, or on a separate server computer as desired. More generally, in various embodiments, the management server 510 and the content server 512 may be implemented on one or more server computers and/or one or more storage devices as desired. Thus, in one exemplary embodiment, the management server may be included on the content server computer. In another embodiment, the content server may be implemented on or included in a management server computer. In other embodiments, the management server and the content server may each be implemented on respective server computers. In yet further exemplary embodiments, the content server computer may host the management server, and may include or be coupled to one or more storage devices that store the presentation materials, e.g., in the form of a storage area network (SAN).

Depending on the particular architecture of the system, the uploading of the presentation materials, and/or the provision, e.g., streaming, of the presentation materials during the videoconference call, may be performed in various ways.

For example, in one embodiment, providing, e.g., streaming, the presentation materials from the content server computer may include providing the presentation materials directly to a first videoconferencing endpoint of the plurality of videoconferencing endpoints, e.g., the host participant's endpoint, from the content server over the network, and providing the presentation materials from the first videoconferencing endpoint to each of the other videoconferencing endpoints over the network.

Figure 7A:
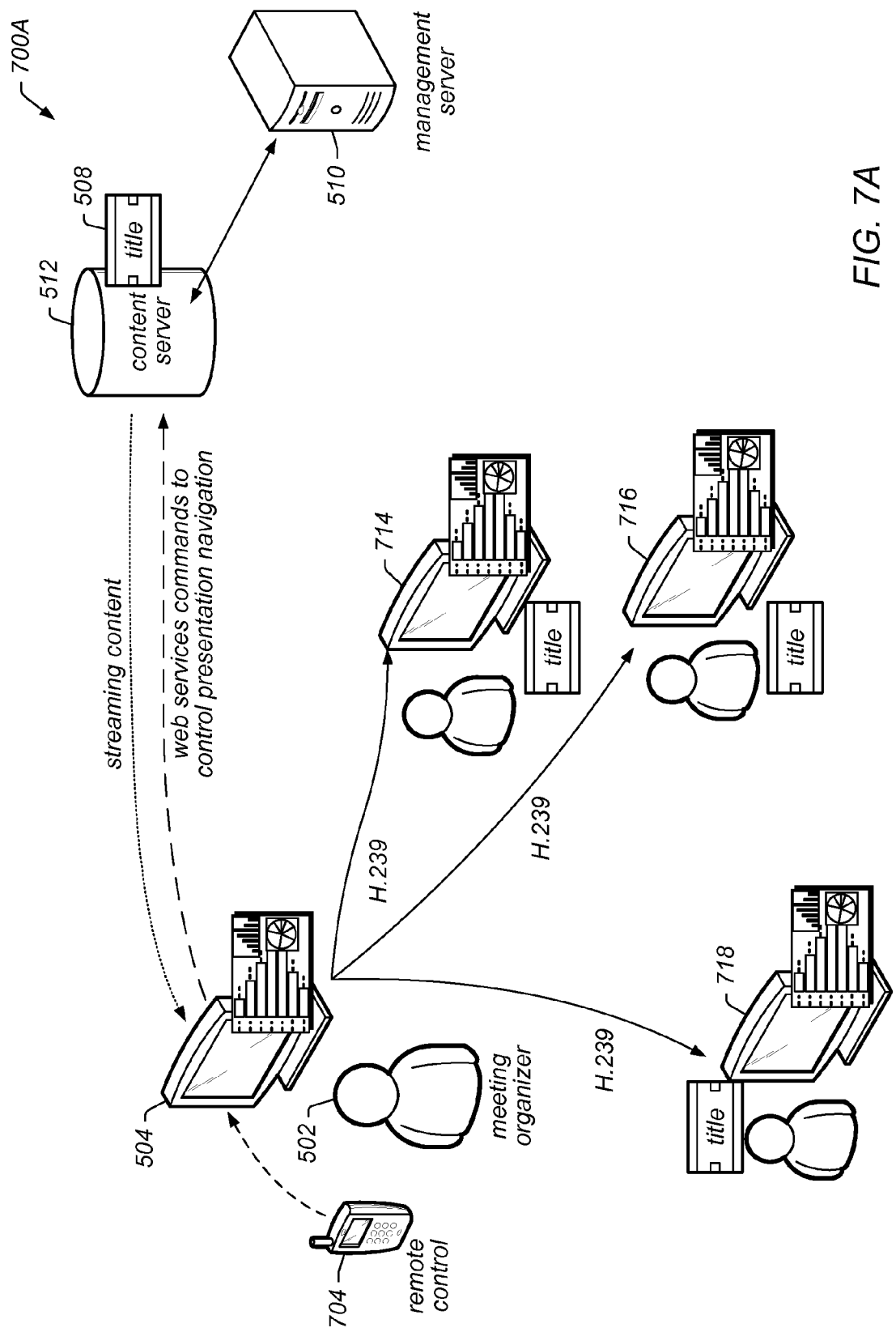
FIGS. 7A and 7B illustrate respective embodiments of presentation provision from a content server in the exemplary videoconferencing system of FIG. 5, according to one embodiment.

Such an embodiment is shown in FIG. 7A, where the content server (which may be implemented on a content server computer and/or a management server computer), possibly under control of the management server 510, provides content, specifically, the presentation materials 508, to the host endpoint or codec 504, which then provides the presentation materials 508 to each of the other participant's endpoints 714, 716, and 718, respectively, generally under the control of the host participant. As FIG. 7A indicates, during the videoconference call, the presentation materials may be presented by each endpoint, e.g., may be displayed on a display device of each respective endpoint for viewing by the corresponding participants, audibly presented via speakers, and so forth. Note that the presentation of the presentation materials may be in addition to communication content to and from the endpoints, e.g., voices and images of the videoconference participants. For example, at each endpoint, the images of the presentation materials may be displayed in a separate window from images of the other participants.

Alternatively, in some embodiments, providing the presentation materials from the content server computer may include providing the presentation materials directly to each of the plurality of videoconferencing endpoints from the content server over the network.

Figure 7B:
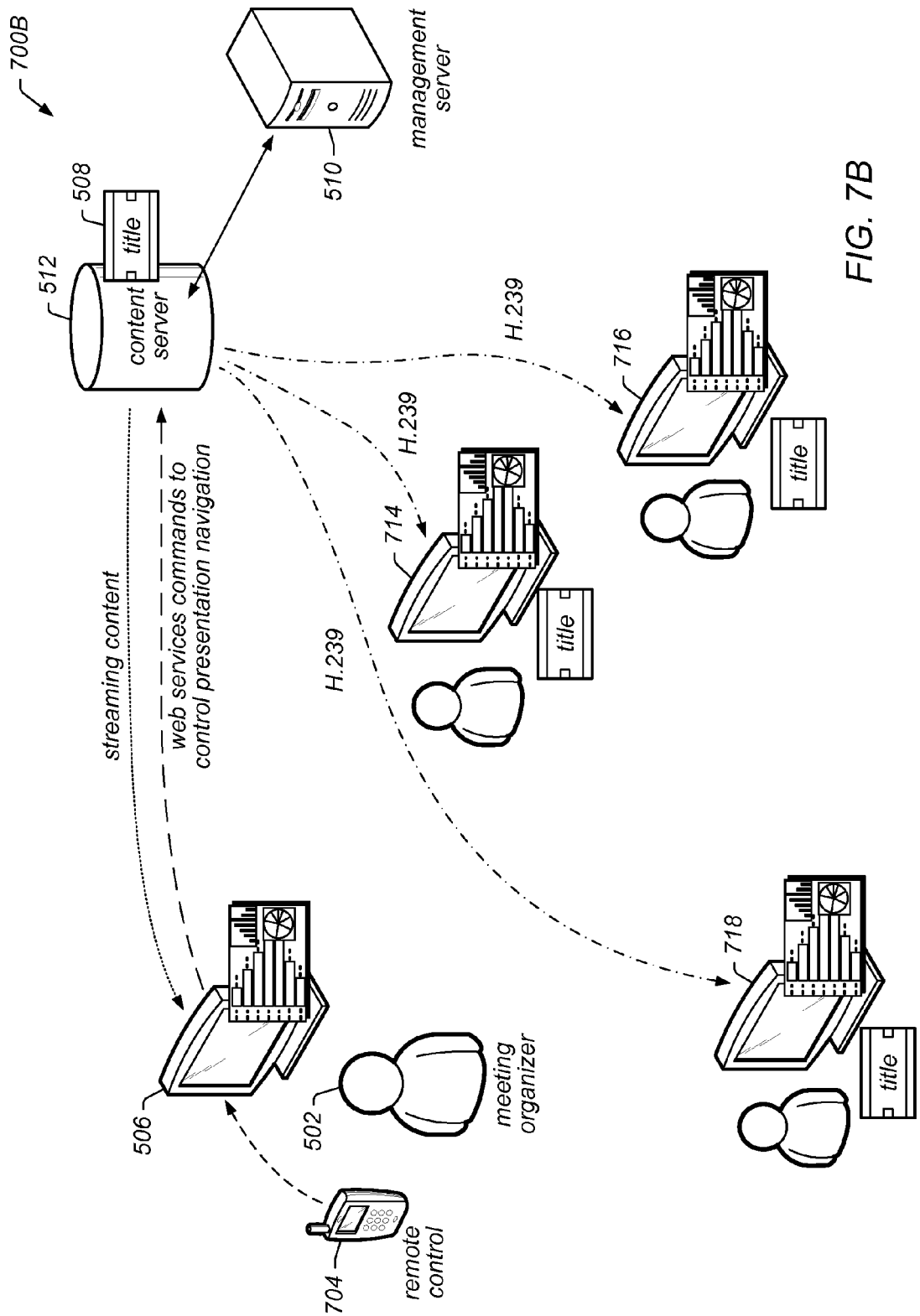

FIG. 7B illustrates such an embodiment, where, as may be seen, the content server (implemented on a content server computer and/or a management server computer), possibly under control of the management server 510, provides content, i.e., the presentation materials 508, to each of the participant endpoints 506, 714, 716, and 718, respectively, for presentation to the respective participants. Note that even though the materials are provided, e.g., streamed, directly to the endpoints, in some embodiments, the host participant may still control the providing, although in some embodiments, one or more of the other participants may also control the providing to some extent, as described in more detail below.

In embodiments where the management server is included on a management server computer coupled to the content server computer, uploading the presentation materials to the content server computer may include uploading the presentation materials to the management server computer, and transferring the presentation materials from the management server computer to the content server computer. Similarly, in some such embodiments, providing the presentation materials from the content server computer may include providing the presentation materials from the content server computer to the management server computer, and providing the presentation materials from the management server computer to each of the plurality of videoconferencing endpoints directly.

Alternatively, providing the presentation materials from the content server computer may include providing the presentation materials from the content server computer to the management server computer, providing the presentation materials to a first videoconferencing endpoint of the plurality of videoconferencing endpoints from the management server computer over the network, and providing the presentation materials from the first videoconferencing endpoint to each of the other videoconferencing endpoints over the network.

In one embodiment, the method may include receiving one or more commands from a first videoconferencing endpoint of the plurality of videoconferencing endpoints, e.g., the host participant's endpoint, regarding browsing or presentation of the presentation materials in response to user input to the first videoconferencing endpoint indicating the one or more commands, where the providing is performed in accordance with the one or more commands. Said another way, one or more of the videoconferencing endpoints may be configured to receive user input indicating one or more commands regarding browsing or presentation of the presentation materials, and may send the one or more commands to the content server computer, which may provide, e.g., stream, the presentation materials in accordance with the one or more commands.

FIGS. 7A and 7B illustrate exemplary embodiments where, as shown, web services commands to control presentation or navigation of the presentation materials are sent from the endpoint of the meeting organizer (the host participant) to the content server 512, which presents or provides the content accordingly. Thus, the content server may receive the one or more commands from the first videoconferencing endpoint, and provide (or browse) content accordingly.

As these figures also indicate, in some embodiments, the user input to the first videoconferencing endpoint may be received from the user via a remote control 704. Thus, for example, the host participant may specify one or more operations via the remote control, which may accordingly transmit commands to the host participant's endpoint, which may in turn send the commands to the content server to control browsing and/or presentation of the presentation materials. For example, commands may be sent from the videoconferencing remote or endpoint/codec to control page up/page down of the presentation, start/stop/pause of video content, etc., thereby controlling the flow of the presentation.

Note that the content server computer may respond to such commands directly, or under the control of the management server 510. In other words, in some embodiments, the management server may be configured to receive the one or more commands from the first videoconferencing endpoint, and may control the providing of the presentation materials to each of the plurality of videoconferencing endpoints from the content server computer in accordance with the one or more commands. Similarly, in embodiments where the management server is implemented on a separate server computer from the content server, receiving the one or more commands from the first videoconferencing endpoint may include a management server computer receiving the one or more commands from the first (e.g., host) videoconferencing endpoint, and the content server receiving the one or more commands from the management server computer. More generally, one or more of the videoconferencing endpoints may be configured to receive user input indicating one or more commands regarding browsing or presentation of the presentation materials, and may send the one or more commands to the management server computer. The content server computer may receive the commands from the management server computer and provide the presentation materials accordingly.

Moreover, in some embodiments, further presentation materials may be provided to the content server computer by one or more others of the participants for presentation during the videoconference call. For example, the additional presentation materials may be uploaded to the content server computer in response to receiving user input from a participant corresponding to another videoconferencing endpoint (other than the host or first endpoint) specifying additional presentation materials for presentation during the videoconference call. During the videoconference call, the additional presentation materials may be provided to each of the plurality of videoconferencing endpoints from the content server.

Additionally, in some embodiments, one or more further commands may be received from another videoconferencing endpoint of the plurality of videoconferencing endpoints regarding browsing or presentation of the presentation materials in response to user input to the other videoconferencing endpoint indicating the one or more further commands. During the videoconference call, the presentation materials may be provided to one or more of the videoconferencing endpoints, including the other videoconferencing endpoint, in accordance with the one or more further commands. In other words, in some embodiments, participants other than the host participant (meeting organizer) may have some control over the presentation or browsing of the presentation materials to or by themselves and/or the other participants. Thus, for example, one of the other participants may send commands to browse the materials stored on the content server, e.g., to preview materials yet to be presented, to review materials already presented, or to invoke/control presentation of additional materials to all participants in the call. Thus, in some embodiments, the browsing may be invoked or performed independently, e.g., without cooperation from the hosting participant/endpoint, by a non-hosting participant, e.g., via that participant's endpoint.

In a similar vein, in one embodiment, providing the presentation materials to each of the plurality of videoconferencing endpoints may be initiated in response to respective user input received from each of the plurality of videoconferencing endpoints. In other words, each participant may initiate providing of the content to his or her endpoint from the content server. In such cases, the providing may further include synchronizing said providing the presentation materials to each of the plurality of videoconferencing endpoints. As one example, if a participant were to join the videoconference call late, upon joining the call, the content server (possibly under control of the management server) may begin providing the presentation materials from the current position in the data transmission, e.g., the data stream, e.g., as opposed to the beginning In one embodiment, the latecomer may be able to quickly review the already presented materials, e.g., at double speed, and thereby "catch up" with the presentation in progress.

As mentioned above, in some embodiments, the providing may be performed in accordance with the H239 protocol, although it should be noted that any other protocols may be used as desired. Moreover, in various embodiments, the various method elements discussed above, e.g., the scheduling, receiving commands, and providing of the presentation materials, may be implemented by the content server and/or the management server, and may be implemented on a single server computer or distributed across multiple computers, as desired. For example, in one embodiment, the presentation materials may be uploaded to (and provided, e.g., streamed, from) an external website accessible to the management server via the Internet, e.g., any content upload website that exposes a basic set of application programming interfaces (APIs) to facilitate content browsing and providing (e.g., streaming).

More generally, for example, in one embodiment, the above method may be performed by or via a system that includes at least one server computer, including a processor and a memory, coupled to the processor, as well as a plurality of videoconferencing endpoints, each including a respective processor, and a respective memory, coupled to the respective processor. Each of the plurality of videoconferencing endpoints may be coupled to the at least one server computer over a network, where the memory of each of the plurality of videoconferencing endpoints stores program instructions executable by the processor of the videoconferencing endpoint to request a videoconference call with the at least one server in response to user input, where the user input further specifies presentation materials for presentation during the videoconference call. The memory of the at least one server computer may store program instructions executable by the processor of the server computer to schedule the videoconference call in response to the request, upload the presentation materials in response to said scheduling, and conduct the videoconference call between the plurality of participants, including providing the presentation materials to each of the plurality of videoconferencing endpoints. The memory of each of the plurality of videoconferencing endpoints may further store program instructions executable by the processor of the videoconferencing endpoint to establish a connection with the at least one server computer over the network to participate in the videoconference call in response to user input, and during the videoconference call, receive and present the presentation materials provided from the at least one server computer.

Thus, some embodiments of the above system and method may facilitate a presenter of a videoconference feed, e.g., an H239 feed, to walk into a videoconference meeting without having to provide a laptop computer (or other "auxiliary" computer) and yet be able to present the desired slides/documents/videos, etc., to the rest of the participants. At the time of scheduling, the meeting host may attach the documents or files containing content that she wishes to present during the meeting as part of creating a videoconference meeting request in management (scheduling) software. The management software may upload the file(s) to a secure content server for access during the meeting. At the start of the meeting, a connection may be established by the management software (server) to the content server to provide the content (presentation materials) to the meeting host endpoint so that the host can access/browse and present the materials to rest of the remote parties.

Further Exemplary Embodiments

The following describes various other exemplary embodiments of the systems and techniques discussed above, and some benefits thereof, although it should be noted that the embodiments described are exemplary only, and are not intended to limit the systems and methods to any particular form, function, or appearance.

In one embodiment, the uploaded presentation materials may be protected by security measures, e.g., a password, e.g., by a personal identification number (PIN), which must be entered in order to access/provide the content (presentation materials) from the content server computer (e.g., website). Thus, upon uploading the materials, the host participant or organizer may be notified of the details of the upload and the PIN needed to access the materials. The host participant may be informed that the presentation will be ready to start when she walks into the meeting room at the scheduled time of the meeting. Note that in various embodiments, the PIN may apply generally to accessing the content server, to each file, document, or set of materials on the content server, and/or to access by a specified person, as desired. Note further that in other embodiments, any type of security means desired may be used to secure the presentation materials on the content server computer.

The following is directed to an example videoconference among participants in three "video rooms", although the techniques disclosed are applicable in a general sense as well. When the scheduled meeting time arrives, the management server may establish a video conference meeting connection between the endpoints, e.g., video rooms 1, 2, and 3. In one embodiment, the management server may open a presentation channel or stream by connecting to the content server and requesting that the presentation materials be provided to the video room 1 (endpoint) where the presenter (host participant) will be to present the materials (and possibly the other endpoints, as well).

The host participant or organizer may start the presentation by entering the PIN number, and then all the connected participants may start receiving the content, e.g., the content stream, from the host endpoint. In another approach, the participants/endpoints of video rooms 2 and 3 may independently request presentation data, e.g., data streams, from the content server, in which case the management and/or content server may implement synchronization of the data transmission, e.g., of the content streams. Thus, since the presentation materials are securely stored on the content server, the presentation materials may be accessible to all of the participants, e.g., via the PIN, while being secure from unauthorized access.

The host participant or organizer (or current presenter) may control the presentation of the materials, e.g., the movement of slides, presentation of documents, etc., via the endpoint keyboard, mouse, remote control, or touch panel (among other input devices), which may translate into or invoke commands for the (remote) content server to present the materials as desired, e.g., to proceed through document pages, slides, videos, etc., accordingly. For example, key presses on a remote or touch panel may translate into web services (API) calls exposed by the content server to access or control presentation of the materials. Thus, in some embodiments, the host participant (or current presenter) may use a remote control and control the flow of the presentation during the meeting.

As indicated above, in some embodiments, if desired, the host participant may grant remote browsing of content to the other participants, e.g., to participants in video rooms 2 and 3. For example, if the other participants' endpoints are fetching the content directly from the content server instead of from the endpoint of the presenter (the host endpoint), they may issue commands to the content server to control browsing and/or presentation of the materials.

In one embodiment, if the host participant/organizer or one of the other participants wishes to present additional presentation materials, e.g., from a laptop computer, an option may be provided to the participant whereby the participant may choose the source of the feed to present in the meeting. Thus, the source of presentation materials (during the videoconference call) may not be limited to the content server. In this way, additional materials may be introduced to the meeting ad hoc, and from alternate sources, e.g., from an external (or internal) content website. Alternatively, participants may be given the option to upload additional materials (e.g., from any of these alternate sources) to the content server, e.g., before or during the videoconference call, where the additional materials may then be provided as desired from the content server.

In some embodiments, each participant may be able to browse a list of documents or other presentation materials, uploaded either as part of the original meeting request or subsequently, e.g., possibly as part of their responses to the request, to determine which materials to use as the source for the presentation. In other words, a participant may add additional presentation materials for use in the meeting even if they were not the person who scheduled the meeting. Thus, an invited videoconference participant may respond to the meeting request or invitation, or directly to the management server, adding additional materials that she may wish to present during the meeting. Thus, the host or meeting organizer alone need not be responsible for providing all presentation materials; any or all participants may send in (or otherwise provide access to) their respective presentation materials, such that the materials are ready for presentation when the meeting begins. In this way multiple presentations (presentation materials), possibly provided by multiple users, may be shared or presented during the meeting.

As noted above, in one embodiment, the host participant (and possibly others of the participants) may control and/or navigate or browse content on the content server computer using an endpoint remote control, thus obviating any need for a laptop computer for the meeting. For example, presentation materials may be added as part of the attachment or location specification in the meeting schedule request (or subsequently) and may be selected from the content server using the remote via a list of available materials for the meeting presented to the host (or other) participant in a user interface of the participant's endpoint. In some embodiments, remote videoconference participants may also browse the content of the content server, e.g., if they are requesting or fetching presentation feeds from the content server. In this case, an option may be provided to allow the remote participants to synchronize their data transmissions, e.g., data streams, with that of the current presenter so that after browsing back and forth within the currently presented materials, or even other materials on the content server, they can join or rejoin the current presentation at the current position in the presentation.

In one embodiment, since all content may be present on the server (or other data source), all participants may be allowed to download presentation materials, e.g., if desired by the presenter or host participant. In other words, possibly at the discretion of the presenter of respective presentation materials, the other participants may be allowed to download the respective presentation materials, e.g., for current or future consideration. Moreover, in some embodiments, any presentation materials presented (or not) during a meeting may be available on the content server for future access if desired, possibly subject to security measures, e.g., a PIN.

Thus, embodiments of the above described systems and methods may facilitate presentation of materials, e.g., audio, video, documents, slides, and so forth, without requiring the use of additional computers, e.g., a laptop computer, by the host or presenting participant.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

In some embodiments, a computer system (e.g., endpoint and/or server computer) at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A computer-implemented method for performing a videoconference, comprising:
    utilizing one or more computers to perform:
        scheduling a videoconference call in response to user input requesting the videoconference call, wherein the user input further specifies presentation materials for presentation during the videoconference call;
        uploading the presentation materials to a content server computer; and
        conducting the videoconference call between a plurality of participants at respective participant locations, wherein the videoconference call is performed using a plurality of videoconferencing endpoints at respective ones of the participant locations, wherein the plurality of videoconferencing endpoints are coupled to the content server computer over a network; and
        during the videoconference call, providing the presentation materials to each of the plurality of videoconferencing endpoints from the content server computer over the network;
    wherein the provided presentation materials are presented by each videoconferencing endpoint.

2. The computer-implemented method of claim 1, wherein said scheduling, said uploading, and said conducting are performed by a management server.

3. The computer-implemented method of claim 2, wherein the management server is comprised on the content server computer.

4. The computer-implemented method of claim 2, wherein the management server is comprised on a management server computer coupled to the content server computer, and wherein said uploading the presentation materials to the content server computer comprises:

uploading the presentation materials to the management server computer; and transferring the presentation materials from the management server computer to the content server computer.

5. The computer-implemented method of claim 2, wherein the management server is comprised on a management server computer coupled to the content server computer, and wherein said providing comprises:

providing the presentation materials from the content server computer to the management server computer; and providing the presentation materials from the management server computer to each of the plurality of videoconferencing endpoints.

6. The computer-implemented method of claim 2, wherein the management server is comprised on a management server computer coupled to the content server computer, and wherein said providing comprises:

providing the presentation materials from the content server computer to the management server computer;

providing the presentation materials to a first videoconferencing endpoint of the plurality of videoconferencing endpoints from the management server computer over the network; and providing the presentation materials from the first videoconferencing endpoint to each of the other videoconferencing endpoints over the network.

7. The computer-implemented method of claim 1, wherein said providing comprises:

providing the presentation materials directly to each of the plurality of videoconferencing endpoints from the content server over the network.

8. The computer-implemented method of claim 1, wherein said providing comprises:

providing the presentation materials directly to a first videoconferencing endpoint of the plurality of videoconferencing endpoints from the content server over the network; and providing the presentation materials from the first videoconferencing endpoint to each of the other videoconferencing endpoints over the network.

9. The computer-implemented method of claim 1, further comprising:

utilizing the one or more computers to perform:

receiving one or more commands from a first videoconferencing endpoint of the plurality of videoconferencing endpoints regarding browsing or presentation of the presentation materials in response to user input to the first videoconferencing endpoint indicating the one or more commands;

wherein said providing is performed in accordance with the one or more commands.

10. The computer-implemented method of claim 9, wherein the user input to the first videoconferencing endpoint is received from the user via a remote control.

11. The computer-implemented method of claim 9, wherein said receiving one or more commands from a first videoconferencing endpoint comprises:

the content server receiving the one or more commands from the first videoconferencing endpoint.

12. The computer-implemented method of claim 9, wherein said receiving one or more commands from a first videoconferencing endpoint comprises:

a management server computer receiving the one or more commands from a first videoconferencing endpoint; and the content server receiving the one or more commands from the management server computer.

13. The computer-implemented method of claim 9, further comprising:

utilizing the one or more computers to perform:

uploading the additional presentation materials to the content server computer in response to receiving user input from a participant corresponding to another videoconferencing endpoint specifying additional presentation materials for presentation during the videoconference call;

during the videoconference call, providing the additional presentation materials to each of the plurality of videoconferencing endpoints from the content server.

14. The computer-implemented method of claim 1, further comprising:

utilizing the one or more computers to perform:

receiving one or more further commands from another videoconferencing endpoint of the plurality of videoconferencing endpoints regarding browsing or presentation of the presentation materials in response to user input to the other videoconferencing endpoint indicating the one or more further commands; and during the videoconference call, providing the presentation materials to one or more of the videoconferencing endpoints, including the other videoconferencing endpoint, in accordance with the one or more further commands.

15. The computer-implemented method of claim 1, wherein said providing the presentation materials to each of the plurality of videoconferencing endpoints is initiated in response to respective user input received from each of the plurality of videoconferencing endpoints, and wherein said providing further comprises synchronizing said providing the presentation materials to each of the plurality of videoconferencing endpoints.

16. A computer accessible memory medium storing program instructions for performing a videoconference, wherein the program instructions are executable by a processor to implement:

scheduling a videoconference call in response to user input requesting the videoconference call, wherein the user input further specifies presentation materials for presentation during the videoconference call;

uploading the presentation materials to a content server computer; and conducting the videoconference call between a plurality of participants at respective participant locations, wherein the videoconference call is performed using a plurality of videoconferencing endpoints at respective ones of the participant locations, wherein the plurality of videoconferencing endpoints are coupled to the content server computer over a network;

wherein during the videoconference call the presentation materials are provided to each of the plurality of videoconferencing endpoints from the content server computer.

17. The computer accessible memory medium of claim 16, wherein the program instructions are further executable to implement:

receiving one or more commands from a first videoconferencing endpoint of the plurality of videoconferencing endpoints regarding browsing or presentation of the presentation materials in response to user input to the first videoconferencing endpoint indicating the one or more commands; and controlling the providing of the presentation materials to each of the plurality of videoconferencing endpoints from the content server computer in accordance with the one or more commands.

18. The computer accessible memory medium of claim 17, wherein the program instructions are further executable to implement:

receiving one or more commands from another videoconferencing endpoint of the plurality of videoconferencing endpoints regarding browsing or presentation of the presentation materials in response to user input to the other videoconferencing endpoint indicating the one or more commands; and controlling the providing of the presentation materials to one or more of the videoconferencing endpoints, including the other videoconferencing endpoint, from the content server computer in accordance with the one or more commands.

19. A computer accessible memory medium storing program instructions for performing a videoconference call between a plurality of participants at respective participant locations, wherein the videoconference call is performed using a plurality of videoconferencing endpoints at respective ones of the participant locations, wherein the program instructions are executable by a processor of each videoconferencing endpoint to implement:

scheduling a videoconference call with a management server in response to user input requesting the videoconference call, wherein the user input further specifies presentation materials for presentation during the videoconference call;

wherein the presentation materials are uploaded to a content server computer by the management server in response to said scheduling;

during the videoconference call:
receiving the presentation materials provided from the content server computer; and
presenting the provided presentation materials.

20. The computer accessible memory medium of claim 19, wherein the program instructions are further executable to implement:

receiving user input indicating one or more commands regarding browsing or presentation of the presentation materials; and sending the one or more commands to the content server computer;

wherein the content server computer provides the presentation materials in accordance with the one or more commands.

21. The computer accessible memory medium of claim 20, wherein the program instructions are further executable to implement:

receiving user input indicating one or more commands regarding browsing or presentation of the presentation materials; and sending the one or more commands to a management server computer;

wherein the content server receives the one or more commands from the management server computer and provides the presentation materials in accordance with the one or more commands.

22. A computer accessible memory medium storing program instructions for performing a videoconference, wherein the program instructions are executable by a processor to implement:

in response to scheduling a videoconference call in response to user input requesting the videoconference call, wherein the user input further specifies presentation materials for presentation during the videoconference call, uploading the presentation materials; and during a videoconference call between a plurality of participants at respective participant locations, wherein the videoconference call is performed using a plurality of videoconferencing endpoints at respective ones of the participant locations, providing the presentation materials to each of the plurality of videoconferencing endpoints.

23. The computer accessible memory medium of claim 22, wherein the program instructions are further executable to implement:

receiving one or more commands from a first videoconferencing endpoint of the plurality of videoconferencing endpoints regarding browsing or presentation of the presentation materials in response to user input to the first videoconferencing endpoint indicating the one or more commands;

wherein said the providing of the presentation materials to each of the plurality of videoconferencing endpoints is performed in accordance with the one or more commands.

24. The computer accessible memory medium of claim 23, wherein the program instructions are further executable to implement:

receiving one or more commands from another videoconferencing endpoint of the plurality of videoconferencing endpoints regarding browsing or presentation of the presentation materials in response to user input to the other videoconferencing endpoint indicating the one or more commands; and providing the presentation materials to one or more of the videoconferencing endpoints, including the other videoconferencing endpoint, from the content server computer in accordance with the one or more commands from the other videoconferencing endpoint.

25. A system for performing a videoconference call between a plurality of participants at respective participant locations, wherein the videoconference call is performed using a plurality of videoconferencing endpoints at respective ones of the participant locations, the system comprising:

at least one server computer, comprising:
a processor; and
a memory, coupled to the processor; and a plurality of videoconferencing endpoints, each comprising:
a respective processor; and
a respective memory, coupled to the respective processor;

wherein each of the plurality of videoconferencing endpoints is coupled to the at least one server computer over a network;

wherein the memory of each of the plurality of videoconferencing endpoints stores program instructions executable by the processor of the videoconferencing endpoint to:

request a videoconference call with the at least one server in response to user input, wherein the user input further specifies presentation materials for presentation during the videoconference call;

wherein the memory of the at least one server computer stores program instructions executable by the processor of the server computer to:
  schedule the videoconference call in response to the request;
  upload the presentation materials in response to said scheduling; and
  conduct the videoconference call between the plurality of participants, including providing the presentation materials to each of the plurality of videoconferencing endpoints; and
wherein the memory of each of the plurality of videoconferencing endpoints further stores program instructions executable by the processor of the videoconferencing endpoint to:
  establish a connection with the at least one server computer over the network to participate in the videoconference call in response to user input; and
  during the videoconference call, receive and present the presentation materials provided from the at least one server computer.

* * * * *